United States Patent [19]
Anders et al.

[11] Patent Number: 6,096,369
[45] Date of Patent: Aug. 1, 2000

[54] PROCESS FOR HYDROPHILICIZING THE SURFACE OF POLYMERIC SUBSTRATES WITH A MACROINITIATOR AS PRIMER

[75] Inventors: Christine Anders, Haltern; Robert Hans-Jörg Jacobasch, deceased, late of Dresden; by Margareta Ute Dagmar Jacobasch, heir, Dresden; by Kathrin Götz nee Jacobasch, heir, Berlin; by Lutz Jacobasch, heir, Dresden; by Susanne Jacobasch, heir, Berlin; Volker Steinert, Dresden; Stefan Zschoche, Dresdan, all of Germany

[73] Assignee: Huels Aktiengesellschaft, Marl, Germany

[21] Appl. No.: 09/106,093

[22] Filed: Jun. 29, 1998

[30] Foreign Application Priority Data

Jun. 28, 1997 [DE] Germany .......................... 197 27 554

[51] Int. Cl.[7] .............................. A61L 29/00; A61L 31/00; B05D 1/36; B05D 3/06; C08F 2/46
[52] U.S. Cl. .......................... 427/2.3; 427/2.28; 427/302; 427/333; 427/340; 427/521
[58] Field of Search .................................. 427/2.28, 231, 427/2.3, 307, 302, 333, 340, 412.1, 521, 336

[56] References Cited

U.S. PATENT DOCUMENTS

| | | | |
|---|---|---|---|
| 4,978,481 | 12/1990 | Janssen et al. | 264/1.4 |
| 5,128,170 | 7/1992 | Matsuda et al. | 427/2 |
| 5,512,329 | 4/1996 | Guire et al. | 427/508 |
| 5,869,127 | 2/1999 | Zhong | 427/2.12 |

FOREIGN PATENT DOCUMENTS

| | | |
|---|---|---|
| 0 370 477 | 5/1990 | European Pat. Off. . |
| 0 431 213 | 6/1991 | European Pat. Off. . |
| 22 42 818 | 3/1973 | Germany . |
| 30 44 531 | 8/1981 | Germany . |
| 40 34 901 | 4/1992 | Germany . |
| WO 92/18098 | 10/1992 | WIPO . |
| WO 94/16648 | 8/1994 | WIPO . |

OTHER PUBLICATIONS

W. Kohnen, et al., Staphylococci and Staphylococcal Infections, pp. 408–410, "Staphylococcal Adherence to Modified Synthetic Polymer Surfaces", Jun. 29–Jul. 3, 1992.

Tatsuro Ouchi, et al., Prog. Polym. Sci., Vol. 20, pp. 211–257, "Macromolecular Prodrugs", 1993.

S.E. Tebbs, et al., The British Society for Antimicrobial Chemotherapy, pp. 261–271, "A Novel Antimicrobial Central Venous Catheter Impregnated with Benzalkonium Chloride", 1993.

*Primary Examiner*—Shrive Beck
*Assistant Examiner*—Jennifer Kolb
*Attorney, Agent, or Firm*—Oblon, Spivak, McClelland, Maier & Neustadt, P.C.

[57] ABSTRACT

The invention relates to a process for making the surface of polymeric substrates hydrophilic, which includes coating the surface of a polymeric substrate with a solution of a macroinitiator, wherein the macroinitiator includes a polymer framework and side chains attached to the polymer framework, and wherein at least one of the side chains includes at least one free-radical-forming group. Optionally, a hydrophilic vinyl monomer or monomers may then be free-radical polymerized or graft polymerized onto the macroinitiator-coated substrate. A crosslinking vinyl monomer may optionally be used together with the macroinitiator or the hydrophilic vinyl monomer. The invention also relates to polymeric substrates having hydrophilic surfaces obtained by the process, and articles that include the hydrophilic polymeric substrates.

14 Claims, No Drawings

PROCESS FOR HYDROPHILICIZING THE SURFACE OF POLYMERIC SUBSTRATES WITH A MACROINITIATOR AS PRIMER

BACKGROUND OF THE INVENTION

1. Field of the Invention

The invention relates to a process for making the surface of polymeric substrates permanently hydrophilic with hydrophilic monomers using a macroinitiator as primer. It also relates to products having hydrophilic surfaces made by the process which are suitable for use for technical, medical or biotechnical purposes.

2. Discussion of the Background

Polymers (or plastics) having a hydrophilic surface possess various advantages, depending on the intended use, over polymers with a hydrophobic surface. The greater surface energy of hydrophilic surfaces results in better wettability with water, aqueous solutions or dispersions and with other liquids having a high surface tension. Improved wettability is, for example, useful or indeed necessary if a plastics surface is to be printed or dyed with polar dyes or if plastics surfaces are to be joined together using a polar adhesive. In addition, fibers and textile wovens or nonwovens made from polymers require good wettability for sizing, finishing and dyeing.

Hydrophilic surfaces are also important in the case of polymeric materials which are used in aqueous systems. For instance, technical membranes whose purpose, for example, is that of sea water desalination must be easily wetted in order to fully develop their separating effect. The surfaces of plastic pipes or chemical apparatus must be readily wettable where good heat exchange with the environment or, in the case of pipes, where good flow is critical. Good wettabilty is also advantageous for beds of polymer particles through which flow takes place, for example ion exchange resins, and for similarly flow-traversed beds of porous layers, for example dialysis membranes. Another unwanted phenomenon, since it inhibits function, is that of gas bubbles, which settle on the liquid-side surfaces of plastic pipes, hoses or containers because the surfaces are not sufficiently wetted by the liquid.

Plastics with hydrophilic surfaces are indispensable for numerous medical or biotechnical applications because, in contrast to plastics having a hydrophobic surface, they are very highly compatible with blood, tissue fluids or other liquids containing sensitive biological ingredients. Examples of such applications are blood plasma containers, dialysis hoses, catheters, contact lenses, etc.

Polymeric substrates may be made hydrophilic by single-stage or multistage physical and/or chemical treatment. All known treatment processes are aimed at creating hydrophilic groups, such as hydroxyl, carboxyl or keto groups, on the surface of the polymeric substrate. This can be achieved by processes in which the hydrophilic groups form from peripheral or near-surface layers of the polymer itself. Alternatively, or additionally, it is possible to apply layers of hydrophilic compounds to the surface, with or without pretreatment, and—where vinyl monomers are concerned—to carry out polymerization The single-stage treatment processes which bring about the desired hydrophilic groups from the polymer itself include flaming techniques (D. Briggs et al., J. Mater Sci. 14, 1979, 1344) and corona treatments (J. M. Lane et al., Progress in Organic Coatings, 21, 1993, 269–284). The hydrophilic surface produced in this way, however, is frequently unstable and degrades within hours or days. Plasma processes have also been disclosed, which produce the hydrophilic groups in one stage from the polymer itself. According to W. Mohl, Kunststoffe 81 (1981), 7, polyethylene or polypropylene is treated with low-pressure plasma and is then more suitable for the production of composite materials. Similarly, J. F. Friedrich et al. in GAK 6/94, Volume 47, 382–388 describe a plasma pretreatment of polymers, for example polyolefins, by means of which they can be better bonded with polyurethanes. Plasma processes give satisfactory results if the substrates are bonded soon after the treatment. The hydrophilic properties can be stabilized by further reaction, for example, with hydrophilic monomers. By the above means, chemically bonded, hydrophilic and possibly bulky groups are produced on the surface which are unable to migrate into the interior. However, plasma processes frequently lead to instances of erosion, which make the surface rough. This is frequently unwanted, for example, if the purpose of making the surface hydrophilic is to reduce the frictional coefficient with water. Roughening the surface impairs the tribological properties and acts contrary to this goal.

As a result of a single-stage oxidative treatment with chromium(VI) acid, hydrophilic groups form on the surface of polypropylene from the layers close to the surface (Kang-Wook Lee et al. in Macromolecules 1988, 21, 309–313). However, chromium(VI) compounds are to be avoided where possible in industry because they are carcinogenic and are not permitted to enter the environment.

In other known processes the hydrophilic groups are introduced by coating the substrate with a hydrophilic coating material. A distinction can be made here between processes with and without pretreatment of the polymeric substrate surface, for example, by means of laser, plasma, etc. (the initial cleaning of the surface with a solvent, which is envisaged for almost all of the relevant processes, is not regarded as pretreatment).

One coating process without pretreatment of the substrate is the grafting of polypropylene with 2-hydroxyethyl methacrylate (HEMA), which has been described by S. R. Shukla et al. in J. Appl. Polym. Sci., Vol. 51, 1567–74 (1994). If polymerization is initiated with UV radiation in this case the additional use of methanol as a solvent is necessary, which is toxicologically unacceptable and pollutes the waste water. If the polymerization is initiated by means of uranyl nitrate or cerium ammonium nitrate, it is necessary to prevent the passage of the heavy metals uranium and cerium into the waste water.

The coating processes without pretreatment of the substrate also include the procedure of B. D. Ratner et al., U.S. Pat. No. 5,002,794, in which hydrophilic substances such as polyethylene glycol or 2-hydroxyethyl methacrylate (HEMA) are deposited by means of plasma on metallic, silicatic or plastics surfaces. Hydrophilic monomers, such as HEMA, in this case polymerize spontaneously under the influence of free radicals which are produced by the plasma. H. Mirzadeh et al., Biomaterials, 1995 Vol. 4, No. 8, 641–648 mention the grafting of acrylamide or HEMA onto a specific polymer, namely vulcanized ethylene-propylene rubber. with the aid of a pulsed $CO_2$ laser. According to S. Edge et al., Polymer Bulletin 27 (1992), 441–445, poly (etherimides) are made hydrophilic without pretreatment of the surface by photochemical grafting of HEMA from the vapor phase. The radiation source used for this purpose is a mercury vapor lamp. Furthermore, according to B. Jansen et al., J. Polymer. Sci., Polymer Symposium 66 (1979), 465–473, a specific polyurethane, Tuftan 410 from B.F.

Goodrich, can be grafted with HEMA by irradiation with gamma rays from $^{60}$cobalt. The disadvantages of this process are the expensive radiation protection measures required.

It remains an open question whether, in the case of the processes mentioned in the preceding paragraph, the radiation or the plasma brings about only the polymerization of the monomers or simultaneously activates the surface of the polymeric substrate as well. The latter is presumably the case, since on the one hand, as mentioned above, the effect of the plasma and of corona treatments in making plastics surfaces hydrophilic is known. In any case, both the radiation and the plasma are of such high energy that the hydrophilic monomers, and the polymer formed from them, are attacked. H. Yasuda refers accordingly in J. Polym. Sci.: Macromolecular Review, Vol. 16, 199–293 (1981) to the undefined and uncontrollable chemistry of plasma polymerization. The fact that molecules are destroyed in the course of this process can be demonstrated, in the case of surface coating with HEMA, by the fact that ESCA (Electronic Spectroscopy for Chemical Analysis) in accordance with H. Morra et al., J. Biomed. Mat. Res., 29, 39–45 1995 gives lower than expected values for oxygen in plasma-polymerized HEMA than those which are actually found for HEMA polymerized in a conventional manner, i.e. by a free-radical method. For some applications this may be unimportant. However, in the case of medical or biotechnical applications, a layer of intact HEMA is highly desirable since, as already mentioned, such layers are very highly compatible with the sensitive ingredients of the liquids involved in these applications.

Processes have also been disclosed in which coating with polymerizable monomers is preceded by an activating radiation treatment which modifies the surface of the plastic. Activation and coating of the surface are therefore carried out at separate times. P. Gatenholm et al., Polym. Mater. Sci., 1992, 66, 445–6 describe making polypropylene films and microporous membranes hydrophilic by treatment with ozone and subsequent coatings with HEMA, the polymerization of which is initiated by dissociation of the hydroperoxide groups formed on the surface. A disadvantage of this process is that a relatively high concentration of ozone destroys the polymer. Finally, H. Thelen et al., in Fresenius, J. Anal. Chem. 1995, 353: 290–296, describe a hydrophilic treatment of polyether sulfones in which the substrate is first treated with nitrogen plasma in the presence of small amounts of oxygen and then is coated with HEMA. The process is laborious because the polyether sulfone membrane must be extracted before coating and, as is also the case in the process of Gatenholm et al., oxygen, which inhibits the polymerization, must be carefully excluded from the HEMA solution. Furthermore, the concentration of hydroperoxide groups on the surface, and therefore the grafting density, are difficult to control in the two processes mentioned above.

The literature, moreover, describes peroxide-containing polymers as macroinitiators. In these systems the photolytically or thermally cleavable groups are located in the polymer framework (DE 30 44 531, EP O 370 477). When these groups are cleaved with the formation of free radicals, the polymer framework is broken down and thus loses its stability. A polymer of this kind cannot be applied to other substrates by simple dipping, with formation of a permanent interpenetrating polymer network (IPN), since the cleavage of the abovementioned groups leads to formation of small polymer pieces, which diffuse out of the substrate network.

DE-A 22 42 818 mentions the preparation of polymers whose side chains contain peroxydiester groups but for which no specific application is mentioned.

SUMMARY OF THE INVENTION

One object of the invention is to provide a process for coating a wide variety of hydrophobic substrates with a very wide variety of hydrophilic monomers without having to adapt the process to any notable extent to the respective process parameters.

Another object of the invention is to provide a process that is simple to operate and requires no expensive radiation sources, no irradiation in costly vacuum apparatus, or other expensive apparatus.

Another object of the invention is to provide a process that gives, reproducibly, very uniform coatings and is therefore particularly suitable for a very wide variety of technical, biotechnical and medical applications.

Another object of the invention is to provide a process that requires no laborious prepurification and/or activation steps.

These and other objects of the present invention have been achieved by the discovery that the surface of polymer substrates can be made permanently hydrophilic by free-radical polymerization of hydrophilic vinyl monomers if the substrate is treated beforehand with a solution of a macroinitiator having free-radical-forming groups in side chains of the polymer framework.

Thus, the first embodiment of the invention relates to a process for making the surface of polymeric substrates hydrophilic, that includes coating the surface of a polymeric substrate with a solution of a macroinitiator, wherein the macroinitiator includes a polymer framework and side chains attached to the polymer framework, and wherein at least one of the side chains includes at least one free-radical-forming group.

The second embodiment of the invention relates to a polymeric substrate having a hydrophilic surface, wherein said hydrophilic surface includes the reaction product of a macroinitiator coated on the surface of a polymeric substrate and a hydrophilic vinyl monomer graft-polymerized onto the macroinitiator, wherein the macroinitiator includes a polymer framework and side chains attached to the polymer framework, and wherein at least one of the side chains includes at least one free-radical-forming group.

The third embodiment of the invention relates to articles produced by the above process and articles that include the above-described polymeric substrate having a hydrophilic surface.

BRIEF DESCRIPTION OF THE PREFERRED EMBODIMENTS

Various other objects, features and attendant advantages of the present invention will be more fully appreciated as the same becomes better understood from the following detailed description, which is not intended to be limiting thereof.

The process according to the invention produces hydrophilic coatings which, unexpectedly, are permanent even if there is no covalent attachment of the coating to the polymeric substrate. The attribute "permanent" relates both to the hydrophilic effect and to the adhesive strength of the coating. The latter is based on the fact that the macroinitiator's polymer structure, onto which the vinyl monomers are graft-polymerized, is not destroyed in the course of the radiation-induced dissociation of the free radical-forming groups, so that the interpenetrating polymer network which develops on the substrate when the macroinitiator is applied from its solution remains intact.

The process according to the invention is associated with a range of advantages. It is highly flexible; in other words, a wide variety of hydrophobic substrates can be coated, using a wide variety of macroinitiators, with a very wide variety of hydrophilic monomers without having to adapt the process to any notable extent to the respective process parameters. After coating with the macroinitiator, every polymer surface looks the same. The process is simple to operate and requires no expensive radiation sources, no irradiation in costly vacuum apparatus, or other expensive apparatus. It gives, reproducibly, very uniform coatings and is therefore particularly suitable for a very wide variety of technical, biotechnical and medical applications. The process requires no laborious prepurification and/or activation steps, and there is no risk of the surfaces, or even interior layers, being damaged by aggressive agents or high-energy radiation. In addition, no difficult-to-dispose-of wastes are produced, and the process is acceptable from the standpoint of safety at work provided the usual regulations are observed.

The Polymeric Substrates

The polymeric substrates whose surfaces can be coated hydrophilically by the process of the invention include homo- and copolymers, for example polyolefins, such as polyethylene, polypropylene, polyisobutylene, polybutadiene, polyisoprene, natural rubbers and polyethylene-co-propylene; halogen-containing polymers, such as polyvinyl chloride, polyvinylidene chloride, polychloroprene, polytetrafluoroethylene and polyvinylidene fluoride; polymers and copolymers of vinylaromatic monomers, such as polystyrene, polyvinyltoluene, polystyrene-co-vinyltoluene, polystyrene-co-acrylonitrile, polystyrene-co-butadien-co-acrylonitrile; polycondensates, for example polyesters, such as polyethylene terephthalate and polybutylene terephthalate; polyamides, such as polycaprolactam, polylaurolactam and the polycondensate of adipic acid and hexamethylenediamine; polyether block-amides, for example of laurolactam and polyethylene glycol with on average 8, 12 or 16 ethyleneoxy groups; and also polyurethanes, polyethers, polycarbonates, polysulfones, polyether ketones, polyesteramides and -imides, polyacrylonitrile, polyacrylates and -methacrylates. Blends of two or more polymers or copolymers can also be made hydrophilic by the process, as can combinations of various plastics which are joined to one another by adhesive bonding, welding or melt-fusion, including the transition regions.

The polymeric substrates are not particularly limiting and can have many different geometric shapes. For example, they may be sheets, films, tubes or hoses, depending on the intended use of the product in question.

The Macroinitiator

Suitable macroinitiators (or polymeric initiators) contain, in side chains, photolytically or thermally activatable groups which form free radicals, examples being peroxide, hydroperoxide, perester or azo groups, or ketones. They are synthesized, for example, by polymer-analogous reaction of carboxyl-containing polymers with peroxy alcohols with hydrogen peroxide and subsequently with carbonyl chlorides. An alternative synthesis starts from hydroxyl-containing polymers, which are reacted with hydrazine and then oxidized to the azo compound. Particularly suitable polymers are those prepared from monomers which on the one hand contain functional groups which allow attachment to or conversion into a photolytically or thermally activatable, free-radical-forming group and which on the other hand can be subjected to addition homo- or copolymerization, to homo- or cocondensation or to a homo- or coaddition reaction. Preferred polymers are the polymers with a carbon framework or backbone which are obtainable by addition polymerization or copolymerization. If comonomers are also used, the copolymers may be block copolymers or copolymers with a random or alternating sequence of the monomers.

Suitable polymerizable monomers include those containing hydroxyl groups, such as hydroxyalkyl (meth)acrylates, for example hydroxyethyl or 4-hydroxybutyl (meth) acrylate; 4-hydroxystyrene, 3-hydroxystyrene, 2-hydroxystyrene or 4-vinylresorcinol. Also suitable are monomers containing carboxyl groups, such as (meth) acrylic acid, maleic acid and 4-vinylbenzoic acid; with epoxy groups, such as glycidyl (meth)acrylate; or with anhydride groups, such as maleic anhydride.

Suitable comonomers include vinyl ethers, such as vinyl methyl ether and vinyl butyl ether; vinyl ketones, such as vinyl ethyl ketone; olefins and diolefins, such as 1-butene, 1-hexene, 1,3-butadiene, isoprene and chloroprene; acrylamide and methacrylamide; vinylaromatic compounds, such as styrene, vinyltoluene and divinylbenzene; and vinylsiloxanes. These monomers may even be present in the major amount, for example up to 90 mol %.

A highly suitable class of macroinitiators is based on copolymers of $C_3$–$C_{40}$ α-olefins and maleic anhydride or (meth)acrylic esters and/or comonomers containing acid groups, which are obtainable, for example, from Akzo Nobel Chemicals GmbH, D-52301 Duren. Preference is given to copolymers of $C_{12}$–$C_{14}$, $C_{16}$–$C_{18}$ and $C_{20}$–$C_{22}$ α-olefins. The copolymers are reacted with an alkyl hydroperoxide, for example with tert-peroxybutanol, as a result of which perester groups are formed from the functional groups on the polymer chain. The reaction takes place at a temperature below the respective decomposition temperature of the peroxy groups, generally at a temperature <35° C., judiciously in an inert solvent and in the presence of a tertiary amine, such as triethylamine. Suitable macroinitiators are described in DE 40 34 901 and DE-A 22 42 818, the entire contents of each of which are hereby incorporated by reference.

The Hydrophilic Vinyl Monomers

Suitable hydrophilic vinyl monomers contain one olefinic double bond and at least one hydrophilic group. The olefinic double bond can be present in different kinds of functional radicals, for example in alkenyl radicals, such as vinyl or allyl radicals, or in radicals which are derived from unsaturated carboxylic acids or derivatives thereof, such as acrylic acid, methacrylic acid, the amides of these carboxylic acids or maleic acid. The hydrophilic groups are not particularly limiting. Examples of suitable hydrophilic groups which may be mentioned are: hydroxyl groups, ether groups, acyloxy groups, carboxyl groups, carboxylate groups, carboxamide groups, carboalkoxy groups and nitrile groups; 1,2-epoxide groups; sulfuric ester, sulfonic acid, sulfinic acid, phosphoric acid, phosphoric acid and phosphinic acid groups, including their corresponding salts and esters; primary, secondary and tertiary amino groups; acylamino groups, which can be incorporated in open-chain form or in a ring; polyalkylene oxide groups, such as polyethylene oxide and polypropylene oxide groups, with or without a terminal hydroxyl group; polyester, polyesteramide and polyetheresteramide groups; and radicals of olefinically functionalized sugars. The balance between hydrophilic and hydrophobic components in the molecule of a monomer is of course important for the hydrophilicity of the monomer. Preferable monomers which are suitable for the invention are soluble at 20° C. in water to the extent of at least 1 percent by weight, preferably to the extent of at least 10 percent by weight and, most preferably, to the extent of at least 40 percent by weight, based in each case on the total solution.

Examples of the suitable hydrophilic vinyl monomers which may be mentioned are: acrylic acid and its derivatives, for example acrylamide, N,N-dimethylacrylamide, acrylonitrile, methyl acrylate, 2-hydroxyethyl acrylate, 2-hydroxypropyl acrylate, 2-methoxyethyl acrylate; 2-ethoxyethyl acrylate and 4-hydroxybutyl acrylate, and methacrylic acid and its corresponding derivatives; carboxylic acid vinyl derivatives, such as vinyl acetate, N-vinylacetamide and N-vinylpyrrolidone; vinylsulfonic acids and their alkali metal salts, such as sodium vinyl-sulfonate; alkenylarylsulfonic acids and their alkali metal salts, such as styrenesulfonic acid and sodium styrenesulfonate (o- and p-isomers); vinyl ethers, such as vinyl methyl ether, vinyl ethyl ether, vinyl glycidyl ether and vinyl n-butyl ether: vinyl ketones, such as vinyl methyl ketone, vinyl ethyl ketone and vinyl n-propyl ketone; vinylamines, such as N-vinylpyrrolidine; and sugar derivatives, such as monovinyl-substituted arabinose.

The hydrophilic vinyl monomers can be used in each case individually or as a mixture adapted to a particular intended use, alone or together with crosslinking vinyl monomers. Accordingly, a coating comprising a homo- or a copolymer is obtained on the substrate. The monomers are, alone or together with the crosslinking vinyl monomers, generally employed as solutions with concentration of from 0.1 to 60 percent, advantageously from 5 to 20 percent, by weight based on the total solution. The solvent is preferably water. The solvents need not contain any of the known polymerization initiators or other additives known for polymerization processes.

The Crosslinking Vinyl Monomers

Preferably, a crosslinking agent is used to improve the adhesion of the hydrophilic layer on the substrate. It is preferable to add the crosslinking agent to the solution of the macroinitiator, because in this manner coatings are produced which combine good adhesion with optimum hydrophilicity. If the crosslinking agent is not used until after the application of the macroinitiator as a hydrophilic crosslinking agent alone, or as a hydrophilic or hydrophobic crosslinking agent together with the monoolefinically unsaturated hydrophilic vinyl monomers, the hydrophilicity of the coating may be impaired as compared to the hydrophilicity of a coating made of comparable non-crosslinked hydrophilic vinyl monomers.

The crosslinking vinyl monomers (crosslinkers) preferably have at least 2, and more preferably 3 or 4 olefinic double bonds. When used, the resulting coats are thicker and more stable to delamination. Vinyl monomers having two olefinic double bonds lead to two-dimensional networks, while vinyl monomers with a higher functionality lead to three-dimensional networks. It is of course also possible to operate with two or more different crosslinkers. The crosslinking vinyl monomers preferably contain hydrophilic groups, for example hydroxyl groups and/or alkylene oxide groups, and are then simultaneously hydrophilic and crosslinking vinyl monomers. If the crosslinker is added to the solution of the macroinitiator, it is preferably employed in amounts from 0.01 to 300 mole-percent, more preferably from 10 to 150 mole-percent, based on the peroxide groups of the macroinitiator. If the crosslinker is used together with the hydrophilic vinyl monomers, it is preferably employed in amounts of 0.1 to 50 mole-percent, more preferably from 1 to 20 mole-percent, based on the hydrophilic vinyl monomers.

The crosslinking vinyl monomers may be hydrophilic vinyl monomers, which can be used either alone or together with the monoolefinically unsaturated, i.e., non-crosslinking, hydrophilic vinyl monomers. Alternatively, the crosslinking vinyl monomers may be hydrophobic crosslinkers which are most preferably used together with the non-crosslinking hydrophilic vinyl monomers. The crosslinkers may be present in the solution of the macroinitiator and/or used together with non-crosslinking hydrophilic vinyl monomers.

Examples of suitable hydrophilic or hydrophobic crosslinking vinyl monomers are lower diolefins such as 1,3-butadiene and isoprene and 1,4-divinylbenzene; (meth) acrylic acid derivatives, such as methylenebisacrylamide (MBM), ethylene glycol dimethacrylate (EGDMA), diethylene glycol dimethacrylate, ethylene glycol diacrylate (EGDA), diethylene glycol diacrylate (DEGDA), tetraethylene glycol diacrylate or -methacrylate, polyethylene glycol-400 diacrylate, polyethylene glycol-600 diacrylate, polyethylene glycol-1000 diacrylate, trimethylolpropane triacrylate, trimethylolpropane trimethacrylate and pentaerythritol tetraacrylate; polyvinyl ethers, such as diethylene glycol divinyl ether, polyethylene glycol-300 divinyl ether, polyethylene glycol-1500 divinyl ether, polyethylene glycol-600 divinyl ether, 1,4-cyclohexanedimethanol divinyl ether, 1,4-hexanediol divinyl ether, glycerol 12EO trivinyl ether, pentaerythritol triallyl ether and pentaerythritol 64EO tetravinyl ether (EO: $-\!\!\{CH_2\!\!-\!\!CH_2\!\!-\!\!O\!\}\!\!-$ units); carbohydrate derivatives, such as acryloylated hydroxypropylcellulose with more than one acryloyl group per molecule; and allyl compounds, such as allyl cinnamate, tetraethylene glycol diallyl ether and pentaerythritol tetreallyl ether.

Treatment of the Polymeric Substrate with the Macroinitiator

The macroinitiator is first of all dissolved in an organic solvent, if desired, together with a crosslinker. Examples of suitable solvents are alcohols, such as methanol, ethanol, propanol, isopropanol; ethers, such as diethyl ether, tetrahydrofuran and dioxane; esters, such as ethyl acetate; ketones, such as acetone, methyl ethyl ketone and cyclohexanone; hydrocarbons, such as pentane, hexane, cyclohexane, white spirit, benzene, toluene or xylene; carboxylic acids, such as formic acid and acetic acid; halogenated hydrocarbons, such as dichloromethane, trichloromethane and tetrachloromethane; or strongly polar solvents, such as dimethylformamide, dimethylacetamide and dimethyl sulfoxide. It is of course also possible to employ homogeneous mixtures of two or more of the above mentioned solvents. Preferably, the solvent should on the one hand evaporate as rapidly as possible after the treatment of the substrate, but, more preferably, should also swell the substrate. A favorable solvent for a given combination of macroinitiator and polymeric substrate can be determined without difficultly by means generally known to those of ordinary skill in the art.

The concentration of the macroinitiator in the solution is preferably from 0.5 to 60% by weight, more preferably from 1 to 10% by weight; the concentration of the crosslinker which, if also used, preferably lies in the same range. The latter concentrations, i.e., in the narrower range, have proven particularly suitable in practice and generally lead in one pass to coherent coats of the macroinitiator and, if desired, a crosslinker, having film thicknesses in the nm range which fully cover the substrate. The substrate is treated with the solution by, for example, dipping, brushing or spraying and is subsequently dried, at room temperature or at slightly elevated temperature with or without a vacuum, depending on the solvent.

Coating with Hydrophilic and Optionally Crosslinking Vinyl Monomers

Thermal grafting:

The vinyl monomer or the vinyl monomers is or are preferably applied, if desired, together with a crosslinker, in dissolved form, for example, by dipping, brushing or spraying, to the polymer substrate which has been treated with the macroinitiator. Depending on the macroinitiator, the substrate coated in this manner is then heated with the exclusion of oxygen at preferably from 30 to 130° C., more preferably from 50 to 90° C., thereby initiating the graft polymerization. Alternatively, the substrate with the macroinitiator can be dipped into the vinyl monomer(s) and can be heated to the abovementioned temperatures in the immersed state.

Preferred solvents for the hydrophilic vinyl monomers and, if desired, for hydrophilic crosslinkers are water and water/ethanol mixtures, although other solvents can also be used provided they have sufficient solvency for the vinyl monomer or vinyl monomers and, if desired, for the crosslinker. Depending on the solubility of the monomers and on the desired film thickness, the concentrations of the vinyl monomers and, if desired, the crosslinkers in the solution can preferably be together or individually from 0.1 to 40% by weight, more preferably from 1 to 10% by weight. The latter concentrations have proven particularly suitable in practice and generally lead in one pass to coherent coats which have film thicknesses in the nm range and which fully cover the macroinitiator.

Photoinitiated grafting:

As an alternative to the thermal grafting of the vinyl monomers onto the macroinitiator, photoinitiated grafting is also possible. In this case the vinyl monomers, and, if desired, together with a crosslinker, are applied, as described, to the substrate which has been treated with the macroinitiator, and the coated substrates are then irridated. As an alternative, the substrates can also be irradiated in the immersed state. In both cases, the temperature preferably lies from 20 to 60° C., more preferably from 20 to 40° C.

Irradiation is carried out judiciously with rays in the long-wave segment of the visible range or in the long-wave UV range. Highly suitable rays are those having preferably wavelengths from 260 to 500 nm, more preferably from 290 to 320 nm. Rays within the stated wavelength range are relatively soft and selected with respect to the polymerization and attack neither the polymeric substrate nor the polymer framework of the macroinitiator. Particularly preferred radiation sources are excimer UV radiators (from Heraeus, D63801 Kleinostheim) with continuous radiation, for example with XeCl or XeF as the radiation medium. In principle it is also possible to use mercury vapor lamps having a broad UV spectrum and radiation components in the visible or in the abovementioned range; the exposure times are preferably from 10 seconds to 30 minutes, more preferably from 1 to 15 minutes at radiation intensities in the preferable range from 30 to 200 m W/cm$^2$.

Use of the Hydrophilically Coated Polymer Substrates

Articles having a surface made hydrophilic in whole or in part by the process of the invention are suitable for use for technical, medical or biotechnical purposes as have already been mentioned. Examples of such articles are catheters, hoses, stems, tubes, blood bags, probes, membranes and contact lenses. Where freedom from monomers is important in the context of the use of the substrates coated hydrophilically by the process of the invention, it is preferable to extract the residual monomers from the polymeric hydrophilic coating. This can be carried out with water and subsequently with an organic solvent, for example with hydrocarbons, such as hexane or cyclohexane, and/or with an alkanol having 1 to 4 carbon atoms, such as ethanol and n-propanol.

EXAMPLES

Having generally described this invention, a further understanding can be obtained by reference to certain specific examples which are provided herein for purposes of illustration only and are not intended to be limiting unless otherwise specified.

One measure of the hydrophilicizing effect of the process of the invention is the change in the contact angle of a drop of water or an air bubble. For example, an air bubble is produced below the sample, surrounded by water, which bubble ascends to the sample and wets it depending on its hydrophilicity. A technique of this kind has been described by R. J. Good et al., Techniques of Measuring Contact Angles in Surface and Colloid Science (Ed. R. J. Good), Vol. 11, Plenum Press New York, N.Y., 1979, the entire contents of which are hereby incorporated by reference. In the following examples the contact angles were measured in accordance with this procedure at 25° C.

Another measure of the hydrophilicization is the friction coefficient, $\mu$. The lower the friction coefficient in an aqueous medium, the more hydrophilic the coating of the substrate. The friction coefficient is determined by analogy to DIN 53375 in the case of sheets or films. For hoses, the determination takes place in that the hose to be measured is introduced into a fixed guide hose. A weight of 33.59 g acts on the one end of the hose to be measured, the other end is connected with a tension testing machine (Schenk Trebel RM 50 three-space, PMN=1051). The entire hose-hose system is in contact with water. The hose to be measured is drawn through the guide hose at a speed of 100 mm/m min, and the force required for this is recorded. The friction coefficient $\mu$ results from the friction force F and the normal force W, according to the Euler's rope equation:

$$\mu = 1n(F/W)/\pi$$

The substrates employed are shown in Tables 1a and 1b:

TABLE 1a

Films

| Film No. | Polymer | Name, Source | Preparation |
|---|---|---|---|
| F1 | Polyamide 12 | VESTAMID, HÜLS AG | Extrusion |
| F2 | Polystyrene | VESTYRON, HÜLS AG | Compression molding |
| F3 | Polyurethane | PELLETHANE 2363-A, DOW CHEMICAL COMPANY | Extrusion |
| F4 | Polyether-block-amide | VESTAMID, HULS AG | Extrusion |
| F5 | Polyethylene | VESTOLEN A, VESTOLEN GmbH | Extrusion |
| F6 | Polypropylene | VESTOLEN P, VESTOLEN GmbH | Extrusion |
| F7 | Polyorganosiloxane | NG 37-52, SILICON GmbH; D-01612 Nünchritz | Knife coating |
| F8 | PVC | VESTOLIT P + DEHP, VESTOLIT GmbH | Brabandering |
| F9 | PTFE | HOSTAFLON, HOECHST AG | Extrusion |
| F10 | Polyurethane | TECOFLEX, THERMEDIX | Extrusion |

TABLE 1b

Hoses

| Hose No. | Polymer | Name, Source | Preparation |
|---|---|---|---|
| Hose 1 | Polyethylene | VESTOLEN A, VESTOLEN GmbH | Extrusion |
| Hose 2 | Polyether-block amide | PEBAX 5533, ATOCHEM S.A. | Extrusion |
| Hose 3 | Polyamide | VESTAMID, HÜLS AG | Extrusion |
| Hose 4 | Polyurethane | TECOFLEX, THERMEDIX GmbH | Extrusion |
| Hose 5 | Polyethylene | PELLETHANE 2363-A, DOW CHEMICAL CO. | Extrusion |

The macroinitiators used:

The macroinitiators used are polymers with peroxy ester groups. They are employed as 5% by weight solutions in the solvents specified in Table 2.

TABLE 2

Macroinitiators employed

| Macro initiator designation | Copolymer of | Perester content | Degree of polymerization | Solvent(s) |
|---|---|---|---|---|
| M1 | Propene-maleic acid[1] | 10.8% | 140 | Isopropanol/acetone 30:1 |
| M2 | α-methylstyrene-maleic acid[1] | 15.1% | 270 | THF/acetone/H$_2$O; 1:1:4 |
| M3 | Ethene-maleic acid[1] | 15.3% | 95 | Isopropanol/H$_2$O/THF 5:5:1 |
| M4 | Propene-maleic acid[1] | 20.3% | 120 | Isopropanol/acetone; 30:1 |
| M5 | Ethene-acrylic acid (4:1)[2] | 20.0% | 140 | THF/acetone 3:1 |
| M6 | Vinyl ether-maleic anhydride[2] | 45.0% | 150 | DMF |
| M7 | Ethene-maleic anhydride[2] | 53.0% | 260 | n-propanol/MEK; 10:1 |
| M8 | Styrene-acrylic acid (4:1)[1] | 19.0% | 130 | Ispropanol/acetone 30:1 |
| M9 | Ethene-maleic acid reacted with heptadecyl-succinamide | 21% | 190 | Dioxane |
| M10 | α-octadecene-maleic anhydride | 17.0% | 220 | Isopropanol |
| M11 | α-dodecene-maleic anhydride | 15.0% | 170 | Isopropanol/acetone 20:1 |
| M12 | C$_{20}$ α-olefin-maleic anhydride | 21% | 190 | Ethanol |

[1]from DE 40 34 901
[2]from DE-A 22 42 818

The vinyl monomers and crosslinkers used:

Starting from the monomers listed in Table 3, in each case (a) 5% strength by weight aqueous solutions, (b) 5% strength by weight solutions in isopropanol or (c) 5% strength by weight solutions in acetone/THF/water (4:4:1) were prepared.

TABLE 3

Vinyl monomers used

| Solution designation | Vinyl monomer |
|---|---|
| V1 | Sodium styrenesulfonate |
| V2 | Acrylic acid |
| V3 | Hydroxyethyl methacrylate |
| V4 | Hydroxyethyl acrylate |
| V5 | Monobutyl maleate |
| V6 | Maleic acid |
| V7 | Sodium vinylsulfonate |
| V8 | Polyethylene glycol (1000) dimethacrylate[1] |
| V9 | Diethylene glycol methacrylate |
| V10 | Methylenebisascrylamide[1] |
| V11 | Acrylonitrile |
| V12 | Acrylamide |
| V13 | Pentaerythritol triallyl ether[1] |
| V14 | Ethylene glycol dimethacrylate[1] |

[1]also crosslinker

Coating Processes

After fixing the macroinitiator and, if desired, a crosslinker by immersion in solution and drying, the vinyl monomers, if desired, together with a crosslinker, are applied to the macroinitiator coat in the following way.

TABLE 4

Coating processes for vinyl monomer and, if desired, crosslinker

| Coating index | Coating process |
|---|---|
| BV1 | Dipping |
| BV2 | Spraying |
| BV3 | Brushing |
| BV4 | Fixing in the immersed state |

Coating Experiments

Table 5 lists the results of coating experiments with different macroinitiators, vinyl monomers and crosslinkers, and different coating processes, and the resulting contact angles and/or friction coefficients. It is seen that the polymeric substrates coated in accordance with the invention exhibit a markedly smaller contact angle i.e., friction coefficient than the uncoated substrates; in other words, they have been made hydrophilic.

TABLE 5

Coating Experiments

| Experiment | Substrate | Macroinitiator and, if desired a crosslinker (ratio, concentration) | Solvent(s) for macroinitiator | Monomer (ratio) | Monomer solution[1] | Process | Curing | Temp. | Duration | Contact Angle (°) | Friction coefficient μ |
|---|---|---|---|---|---|---|---|---|---|---|---|
| 1 | F1 | — | — | — | — | — | — | — | — | 74 | — |
| 2 | F1 | M1 | Isopropanol/acetone 30:1 | V1 + V2 (1:3) | a | BV4 | therm. | 80° C. | 180 min | 22 | — |
| 3 | F1 | M1 | Isopropanol/acetone 30:1 | V1 + V2 (1:3) | a | BV4 | UV | 25° C. | 15 min | <15 | — |
| 4 | F2 | — | — | — | — | — | — | — | — | 93 | — |
| 5 | F2 | M2 | THF/acetone/H₂O 1:1:4 | V3 | c | BV1 | therm. | 90° C. | 120 min. | 19 | — |
| 6 | F3 | — | — | — | — | — | — | — | — | 108 | — |
| 7 | F3 | M4 | Isopropanol/acetone 30:1 | V4 + V9 (30:1) | b | BV2 | UV | 25° C. | 4 min. | 21 | — |
| 8 | F4 | — | — | — | — | — | — | — | — | 85 | — |
| 9 | F4 | M9 | Dioxane | V5 | c | BV3 | therm. | 75° C. | 120 min. | 23 | — |
| 10 | F5 | — | — | — | — | — | — | — | — | 95 | — |
| 11 | F5 | M7 | n-propanol/MEK 10:1 | V11 | a | BV4 | UV | 25° C. | 3 min. | 36 | — |
| 12 | F6 | — | — | — | — | — | — | — | — | 100 | — |
| 13 | F6 | M5 | THF/acetone | V6 + V7 (1:1) | c | BV3 | UV | 25° C. | 15 min. | 25 | — |
| 14 | F7 | — | — | — | — | — | — | — | — | 102 | — |
| 15 | F7 | M6 | DMF | V8 | b | BV1 | therm. | 80° C. | 2 h | 34 | — |
| 16 | F8 | — | — | — | — | — | — | — | — | 87 | — |
| 17 | F8 | M8 | Isopropanol/acetone 30:1 | V12 + V10 (50:1) | a | BV1 | UV | 25° C. | 5 min | 24 | — |
| 18 | F9 | — | — | — | — | — | — | — | — | 120 | — |
| 19 | F9 | M3 | Isopropanol/H₂O/THF 5.5:1 | V12 | c | BV2 | therm. | 85° C. | 1 h | 22 | — |
| 20 | F10 | — | — | — | — | — | — | — | — | 102 | — |
| 21 | F10 | M10 | Isopropanol | V2 | a | BV4 | UV | 25° C. | 10 min. | 18 | — |
| 22 | F1 | M11 | Isopropanol/acetone 20:1 | V12 | a | BV4 | therm. | 80° C. | 180 min. | 20 | — |
| 23 | F10 | M12 | Ethanol | V6 | a | BV3 | UV | 25° C. | 10 min. | 21 | — |
| 24 | F1 | M10/V14 (2:1, (2%) | Isopropanol | V2 | a | BV4 | therm. | 90° C. | 3 h. | 20 | — |
| 25 | F1 | M10/V13 (1:1), 2%) | Isopropanol | V2 | a | BV4 | therm. | 90° C. | 3 h. | >15 | — |
| 26 | F1 | M10/V13 (1:3), (3%) | Isopropanol | V2 | a | BV4 | therm. | 90° C. | 3 h. | 17 | — |
| 27 | Hose 2 | M10/V13 (1:1, (10%) | Isopropanol | V2 | a | BV4 | therm. | 90° C. | 3 h. | 18 | 0.04 |
| 28 | Hose 1 | M10/V13 (1:1), (5%) | Isopropanol | V2 | a | BV4 | therm. | 90° C. | 3 h. | 20 | — |
| 29 | Hose 3 | M10/V13 (1:1), (5%) | Isopropanol | V2 | a | BV4 | therm. | 90° C. | 3 h. | 18 | 0.02 |
| 30 | Hose 4 | M10/V13 (1:1), (5%) | Isopropanol | V2 (30%) | a | BV4 | therm. | 90° C. | 30 min. | 17 | 0.06 |
| 31 | Hose 5 | M10/V13 (1:1), (5%) | Isopropanol | V2 (30%) | a | BV4 | therm. | 90° C. | 30 min. | 18 | 0.05 |

Obviously, numerous modifications and variations of the present invention are possible in light of the above teachings. It is therefore to be understood that within the scope of the appended claims, the invention may be practiced otherwise than as specifically described herein.

This application is based on German patent application 197 27 554.0 filed Jun. 28, 1997, the entire contents of which are hereby incorporated by reference.

What is claimed as new and desired to be secured by Letters Patent of the United States is:

1. A process for making the surface of polymeric substrates hydrophilic, comprising:

coating the surface of a polymeric substrate with a solution of a macroinitiator, wherein said macroinitiator comprises a polymer framework and side chains attached to the polymer framework, and wherein at least one of said side chains composes at least one free-radical-forming group, further comprising coating the macroinitiator-coated polymeric substrate with a solution comprising at least one hydrophillic vinyl monomer and graft-polymerizing the hydrophilic vinyl monomer onto side chains of the macroinitiator by thermal initiation or photoinitiation.

2. The process as claimed in claim 1 wherein said free-radical-forming group is selected from the group consisting of a peroxide, hydroperoxide, perester, azo, and ketone group, and mixtures thereof.

3. The process as claimed in claim 1, wherein the hydrophilic vinyl monomer solution comprises 0.1–60% by weight of hydrophilic vinyl monomer based on the weight of the solution.

4. The process as claimed in claim 1, wherein the hydrophilic vinyl monomer is grafted onto the macroinitiator with thermal initiation at a temperature of 30–130° C.

5. The process as claimed in claim 1, wherein the hydrophilic vinyl monomer is grafted onto the macroinitiator with photoinitiation at a temperature of 20–60° C.

6. The process as claimed in claim 1, wherein at least one crosslinker is present in at least one of the solution of the macroinitiator or the solution comprising the hydrophilic vinyl monomer.

7. The process as claimed in claim 6, wherein the crosslinker is present in the solution of the macroinitiator.

8. The process as claimed in claim 6, wherein said crosslinking vinyl monomer is present in an amount of 0.1–50 mol % based on the hydrophilic vinyl monomer.

9. The process as claimed in claim 1, wherein the macroinitiator solution comprises 0.5 to 60% by weight of macroinitiator based on the weight of the solution.

10. The process as claimed in claim 1, wherein the macroinitiator solution further comprises a solvent that swells the polymeric substrate.

11. The process as claimed in claim 1, wherein the polymer substrate is in the form of a sheet, film, tube or hose.

12. The process as claimed in claim 1, wherein the macroinitiator is the product of the reaction of a copolymer of a $C_3$–$C_{40}$ α-olefin and maleic anhydride with an alkyl hydroperoxide.

13. The process as claimed in claim 12, wherein the α-olefin is selected from the group consisting of $C_{12}$–$C_{14}$, $C_{16}$–$C_{18}$ and $C_{20}$–$C_{22}$ α-olefin, and mixtures thereof.

14. The process as claimed in claim 12, wherein the alkylhydroperoxide is tert-peroxybutanol.

* * * * *